(12) United States Patent
Flick

(10) Patent No.: US 9,159,233 B2
(45) Date of Patent: Oct. 13, 2015

(54) SYSTEM INCLUDING VEHICLE LOCATION ALERT BASED COMMUNICATION WITH A VEHICLE AUDIO ENTERTAINMENT SYSTEM AND RELATED METHODS

(71) Applicant: Omega Patents, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 181 days.

(21) Appl. No.: 13/827,590

(22) Filed: Mar. 14, 2013

(65) Prior Publication Data

US 2014/0266811 A1    Sep. 18, 2014

(51) Int. Cl.
| | |
|---|---|
| *H04M 3/00* | (2006.01) |
| *G08G 1/127* | (2006.01) |
| *B60R 25/102* | (2013.01) |
| *B60R 25/33* | (2013.01) |

(52) U.S. Cl.
CPC .............. *G08G 1/127* (2013.01); *B60R 25/102* (2013.01); *B60R 25/33* (2013.01)

(58) Field of Classification Search
CPC ....... H04W 4/22; H04W 4/046; H04W 4/027; B60R 2325/205
USPC ........ 455/569.1, 418, 456.4, 404.1, 420, 416, 455/404.2, 423, 428, 456.1; 701/36, 29.6, 701/1, 2; 340/429, 539.14, 902, 907, 903, 340/426.17, 426.1, 426.13; 370/352
See application file for complete search history.

(56) References Cited

U.S. PATENT DOCUMENTS

| | | | |
|---|---|---|---|
| 5,719,551 A | 2/1998 | Flick | |
| 6,011,960 A | 1/2000 | Flick | |
| 6,900,723 B2 | 5/2005 | Yamanaka et al. | |
| 7,298,246 B1 * | 11/2007 | Schmitt | 340/426.1 |
| 7,308,341 B2 * | 12/2007 | Schofield et al. | 701/1 |
| 7,898,404 B2 | 3/2011 | Flick | |
| 8,032,278 B2 | 10/2011 | Flick | |
| 2002/0130769 A1 * | 9/2002 | Yamagishi | 340/426 |

(Continued)

OTHER PUBLICATIONS

SAE International, Surface Vehicle Standard, Class B Data Communications Network Interface, SAE J1850, Jul. 1995, pp. 1-52.

(Continued)

*Primary Examiner* — Kiet Doan
(74) *Attorney, Agent, or Firm* — Allen, Dyer, Doppelt, Milbrath & Gilchrist, P.A.

(57) ABSTRACT

A system for a vehicle having a data communications bus extending throughout the vehicle, and an audio entertainment system coupled to the data communications bus may include a vehicle wireless transceiver and a vehicle controller to be coupled to the data communications bus. The vehicle controller may be configured to determine and send a vehicle location alert via the vehicle wireless transceiver, and selectively set the audio entertainment system to link with the vehicle wireless transceiver in a hands-free mode. The system may also include a mobile device to be carried by a user remote from the vehicle that may include a remote wireless transceiver configured to link wirelessly with the vehicle wireless transceiver. The mobile device may also include a remote controller cooperating to command, based upon receiving the vehicle location alert, the vehicle controller to set the audio entertainment system into the hands-free mode.

12 Claims, 11 Drawing Sheets

(56) References Cited

U.S. PATENT DOCUMENTS

| | | | |
|---|---|---|---|
| 2007/0015485 A1* | 1/2007 | DeBiasio et al. | 455/345 |
| 2007/0173293 A1* | 7/2007 | Tran | 455/569.1 |
| 2011/0029196 A1* | 2/2011 | Escott | 701/36 |
| 2011/0306329 A1 | 12/2011 | Das | |

OTHER PUBLICATIONS

SAE International, Surface Vehicle Information Report, Chrysler Sensor and Control (CSC) Bus Multiplexing Network for Class 'A' Applications, SAE J2058, Jul. 1990, pp. 1-21.

Thompson, IEEE Spectrum, The Thick and Thin of Car Cabling, Feb. 1996, pp. 42-45.

\* cited by examiner

SYSTEM INCLUDING VEHICLE LOCATION ALERT BASED COMMUNICATION WITH A VEHICLE AUDIO ENTERTAINMENT SYSTEM AND RELATED METHODS

FIELD OF THE INVENTION

The present invention relates to the field of vehicle control systems and, more particularly, to a remote function control system and related methods for vehicles.

BACKGROUND OF THE INVENTION

A vehicle event or status detection system is typically used to notify a person of a given vehicle condition. For example, a vehicle condition or status detection system may be a vehicle alarm system that deters vehicle theft, prevents theft of valuables from a vehicle, deters vandalism, and protects vehicle owners and occupants. A typical vehicle event detection system, for example, includes a central processor or controller connected to vehicle sensors. The sensor, for example, may detect opening of the trunk, hood, doors, windows, and also movement of the vehicle or within the vehicle. An ultrasonic and microwave motion detector, a vibration sensor, a sound discriminator, a differential pressure sensor, a speed detector, and a switch may be used as a sensor. In addition, a radar sensor may be used to monitor the area proximate the vehicle.

The controller typically operates to give an indication in the event of triggering of a vehicle sensor. The indication may typically be a flashing of the lights, an interior visual indicator, an interior audible indicator, and/or the sounding of the vehicle horn or a siren. In addition, the vehicle fuel supply and/or ignition power may be selectively disabled based upon a condition.

The indication provided at the vehicle is important to the overall effectiveness of the event detection system. For example, a weak alarm indication may do little to deter a would-be thief or notify a person of a potential hazard or dangerous vehicle condition. A thief may also be more likely to target a vehicle when the vehicle is among hundreds of vehicles in a large parking lot, for example. In such a situation, the thief may be comforted in knowing that the alarm indication will be ignored by bystanders, since many audible alarm indications are generic. Moreover, once inside the vehicle, the thief may disable the alarm and drive away.

U.S. Pat. No. 6,900,723 to Yamanaka et al. discloses an anti-theft system for vehicles. Positional information is sent to an anti-theft service center upon receiving a theft signal. Audible warnings in the form of voices are sent to the in-vehicle audio system. However, interfacing a security system audible warning to a vehicle entertainment or sound system may be complicated, and may void a manufacturer's warranty.

In addition to the vehicle security functions, another type of detected vehicle condition may include a vehicle speed exceeded condition. A weak speed exceeded notification may do little to deter the driver from speeding. For example, a text display or other stand-alone audio output may not be sufficiently effective in causing a reduction in speed.

One approach to addressing these shortcomings is disclosed in U.S. Pat. No. 7,898,404 to Flick, assigned to the present assignee, and the entire contents of which are herein incorporated by reference. The Flick '404 patent discloses a vehicle speed exceeded notification device that includes an audio entertainment system content interface that is selectively operable to communicate audio content relating to a vehicle speed exceeded condition to a vehicle audio entertainment system. A controller configures the vehicle audio entertainment system, via the vehicle data communications bus, so that the audio content related to the vehicle speed exceeded condition plays through the vehicle audio entertainment system based upon detecting the vehicle speed exceeded condition.

However, still further improvements for detecting and indicating a vehicle status or condition may be desired. In particular, it may desirable to provide a more effective vehicle status alert.

SUMMARY OF THE INVENTION

In view of the foregoing background, it is therefore an object of the present invention to provide a more effective vehicle location alert via the vehicle's audio system using a device readily interfaced with the vehicle audio system.

This and other objects, features, and advantages in accordance with the present invention are provided by a system for a vehicle having a data communications bus extending throughout the vehicle, and a vehicle audio entertainment system coupled to the data communications bus. The system may include a vehicle wireless transceiver, and a vehicle controller to be coupled to the data communications bus. The vehicle controller may be configured to determine and send a vehicle location alert via the vehicle wireless transceiver, and selectively set the vehicle audio entertainment system to link with the vehicle wireless transceiver in a hands-free mode. The system may also include a mobile wireless communications device to be carried by a user remote from the vehicle. The mobile wireless communication device may include a remote wireless transceiver configured to link wirelessly with the vehicle wireless transceiver, and a remote controller cooperating with the remote wireless transceiver to command, based upon receiving the vehicle location alert, to set the vehicle audio entertainment system into the hands-free mode, for example. Accordingly, the system may provide a more effective vehicle location alert and may be readily interfaced with the vehicle's audio system. For example, the mobile wireless communications device may communicate audio, for example, a live voice, via the vehicle's audio entertainment system based upon a vehicle location alert received at the mobile wireless communications device.

The vehicle controller comprises a multi-vehicle compatible controller may be operable with a plurality of different vehicles. The multi-vehicle compatible controller may be configured to be operable with at least one of different bus protocols and different vehicle device bus codes, for example. The system may also include a downloading interface coupled to the multi-vehicle compatible controller.

The vehicle wireless transceiver and the remote wireless transceiver may each include a cellular transceiver, for example. The vehicle controller may be configured to determine the vehicle location alert based upon data on the vehicle data communications bus.

The mobile wireless communications device may include a portable housing carrying the remote wireless transceiver and the remote controller and a display carried by the portable housing and coupled to the remote controller. The mobile wireless communications device may also include at least one input device carried by the portable housing and coupled to the remote controller, for example. The remote controller may be configured to present on the display an option to command the vehicle controller, and accept user selection of the option via the at least one input device.

A method aspect is directed to a method of remotely operating a mobile wireless communications device to be carried by a user remote from a vehicle having a data communications bus extending throughout the vehicle, a vehicle audio entertainment system coupled to the data communications bus, and a vehicle wireless transceiver. The vehicle also has a vehicle controller to be coupled to the data communications bus and configured to determine and send a vehicle location alert via the vehicle wireless transceiver and selectively set the vehicle audio entertainment system to link with the vehicle wireless transceiver in a hands-free mode. The method may include wirelessly linking a remote wireless transceiver of the mobile wireless communications device with the vehicle wireless transceiver, and commanding, via a remote controller of the mobile wireless communications device cooperating with the remote wireless transceiver, the vehicle controller to set the vehicle audio entertainments system into the hands-free mode based upon receiving the vehicle location alert.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation, and like numbers in increments of 100 are used to indicate similar elements in alternative embodiments.

Figure 1:
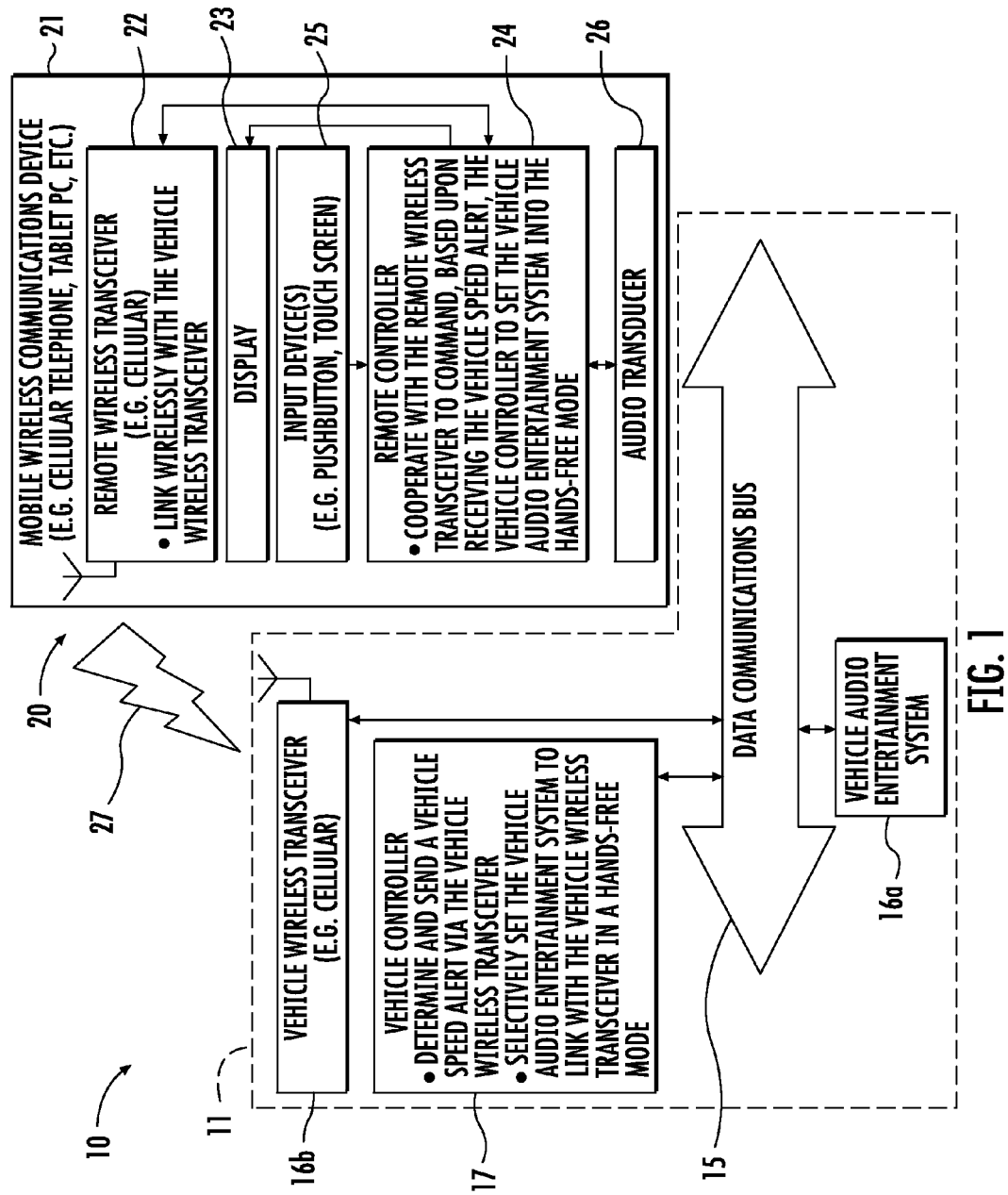
FIG. 1 is a block diagram of a speed alert based system in accordance with the present invention.

Referring initially to FIG. 1, the system 10 illustratively includes a data communications bus 15 extending throughout the vehicle. A vehicle device in the form of a vehicle audio entertainment system 16a is coupled to the data communications bus 15. The vehicle audio entertainment system 16a is configurable via the data communications bus 15.

A vehicle wireless transceiver 16b, which may be a cellular transceiver, for example, is also coupled to the data communications bus 15. Of course, the vehicle wireless transceiver 16b may be another type of wireless communications device.

A vehicle controller 17 is also coupled to the data communications bus 15. The vehicle controller 17 is configured to determine and send a vehicle speed alert via the vehicle wireless transceiver 16b to a mobile wireless communications device 20 that is to be carried by a user remote from the vehicle 11.

The vehicle controller 17 is also configured to selectively set the vehicle audio entertainment system 16a to link with the vehicle wireless transceiver 16b in a hands-free mode. For example, the vehicle controller 17 may control the audio entertainment system 16a to operate in a hands-free mode so that a drive or occupant of the vehicle 11 may communicate via voice using the audio entertainment system.

The mobile wireless communications device 20 may be a cellular telephone, for example, and may include a housing 21 and a remote wireless transceiver 22. The remote wireless transceiver 22 is configured to link wirelessly with the vehicle wireless transceiver 16b. The remote wireless transceiver 22 may be a cellular transceiver, for example, when the mobile wireless communications device 20 is a cellular telephone. A display 23 is also carried by the housing 21, and a remote controller 24 is coupled to the housing and display. One or more input devices 25, for example, pushbuttons and/or a touchscreen display, may be carried by the housing 21 and coupled to the remote controller 24. An audio transducer 25 (input/output) may also be carried by the housing 21 and coupled to the remote controller 24. Of course, the mobile wireless communications device 20 may be any type of mobile wireless communications device and may include any type of remote wireless transceiver.

The remote controller 24 is configured to cooperate with the remote wireless transceiver 22 to command, based upon receiving the vehicle speed alert, the vehicle controller 17 to set the vehicle audio entertainment system 16a. More particularly, the vehicle controller remote controller 22 may cooperate with the vehicle controller 17 to establish an audio communications link 27 based upon the vehicle speed alert. For example, voice communications, which may be bi-directional, may be established with the vehicle 11 via the vehicle audio entertainment system 16a.

Figure 2:
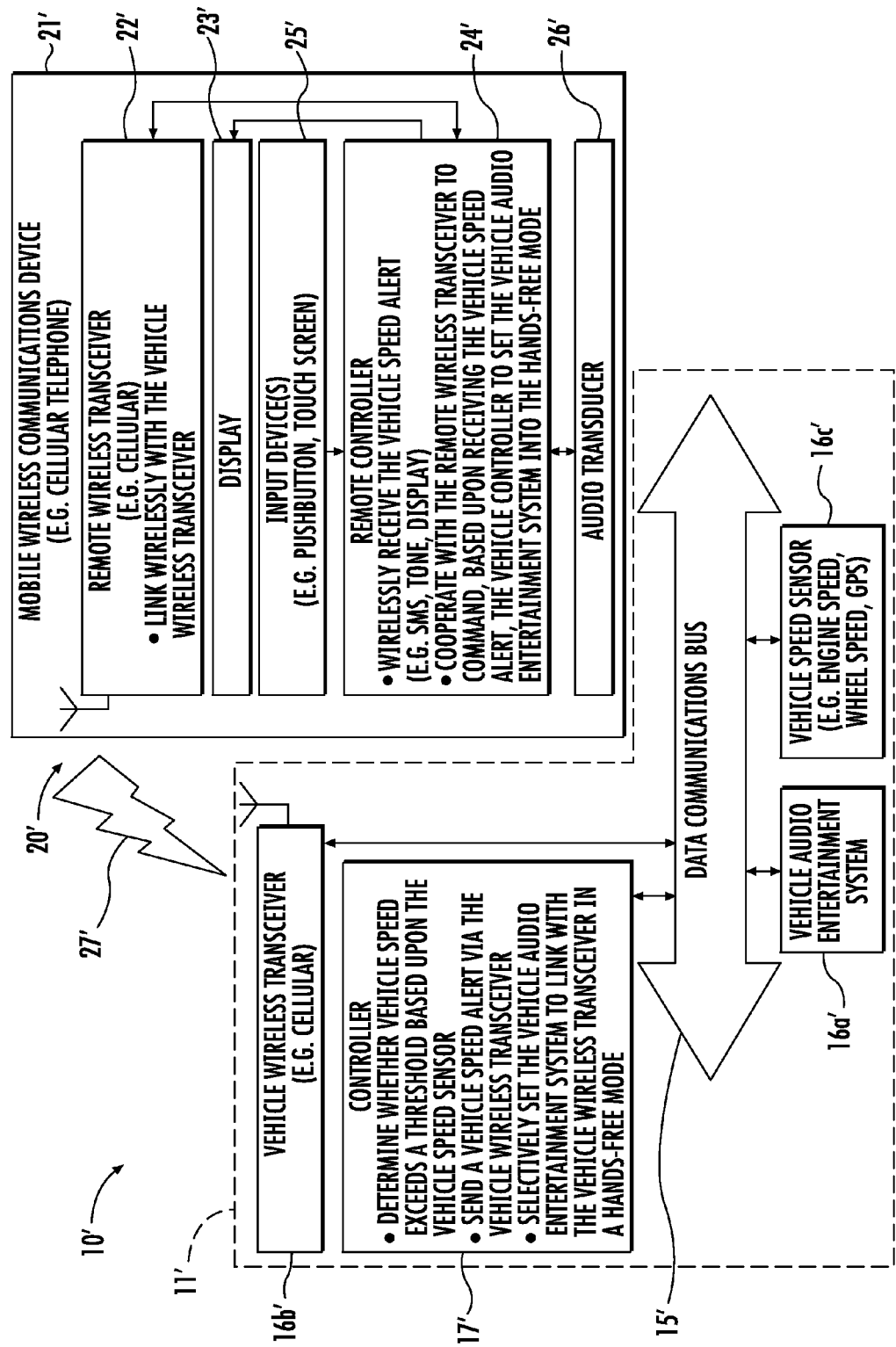
FIG. 2 is a block diagram of a speed alert based system including a vehicle speed sensor in accordance with an embodiment of the present invention.

Referring now to FIG. 2, in another embodiment, another vehicle device in the form of a speed sensor 16c' is also coupled to the data communications bus 15' and cooperates with the vehicle controller 17' for determining the vehicle speed. The speed sensor 16c' may be in the form of a wheel speed sensor, engine speed sensor, or other sensor for determining vehicle speed, for example, a vehicle position sensor (e.g., global positioning system (GPS)), as will be appreciated by those skilled in the art.

The vehicle controller 17' may communicate with the vehicle speed sensor 16c' to determine whether a vehicle speed threshold has been exceeded and send a vehicle speed alert via the wireless 16b' to the mobile wireless communications device 20'. The vehicle speed threshold may be programmed into the vehicle controller 17' as will be appreciated by those skilled in the art. In the case where the vehicle speed sensor 16c' is in the form of a GPS receiver, for example, the vehicle speed threshold may also be determined by mapping the vehicle location to a given roadway having a corresponding speed limit or threshold associated therewith. Further details of vehicle speed exceeded notifications over a vehicle audio system using a vehicle position determining device may also be found in U.S. Pat. No. 7,898,404 Flick.

The remote wireless transceiver 22' receives the vehicle speed alert and initiates a communication, for example, cellular, with the wireless transceiver 16b'. For example, the wireless transceiver 16b' coupled to the data communications bus 15' may have a unique identification associated therewith, which may be a telephone number, for example. The remote controller 24' may initiate a cellular communication or telephone call to the wireless transceiver 16b' based upon the unique ID or telephone number and command the vehicle controller 17' to set the vehicle audio entertainment system in the hands-free mode. The remote controller 24' establishes the audio communications link 27' with the vehicle audio entertainment system 16a'. The audio communications link 27' is established via the wireless transceiver 16b' and based upon the vehicle speed alert.

By way of example, if the speed threshold is set to 65 miles per hour (mph), and the vehicle speed is exceeded, the vehicle controller 17' may send a vehicle speed alert via the wireless transceiver 16b' to the mobile wireless communications device 20'. The remote wireless transceiver 22' receives the vehicle speed alert and cooperates with the remote controller 24' to display the vehicle speed alert on the display 23'. The vehicle speed alert may be in the form of a short message service (SMS) message and may be displayed on the display 23'. The vehicle speed alert may also be in the form of a visual alert from an application being processed by the remote controller 24'. An alert tone may also be played by the audio transducer 26' upon receipt. Of course, the vehicle speed alert may be in another form, and may be visual, audible, haptic, and/or a combination thereof, as will be appreciated by those skilled in the art.

The remote controller 24' establishes the audio communications link 27' with the vehicle audio entertainment system 16a' via the vehicle wireless transceiver 16b' and based upon the vehicle speed alert. This may be particularly advantageous where a parent has a teenage or young driver. The mobile wireless communications device 20' may be the parent's cellular telephone. Upon receipt of a vehicle speed alert, the parent may establish an audio communications link 27' with the vehicle audio entertainment system 16a', for example, overriding music or a current phone conversation with the parent's voice to chide the young driver. Further details of vehicle speed exceeded notifications over a vehicle audio system may be found in U.S. Pat. No. 7,898,404 to Flick, assigned to the present assignee, and the entire contents of which are herein incorporated by reference.

Figure 3:
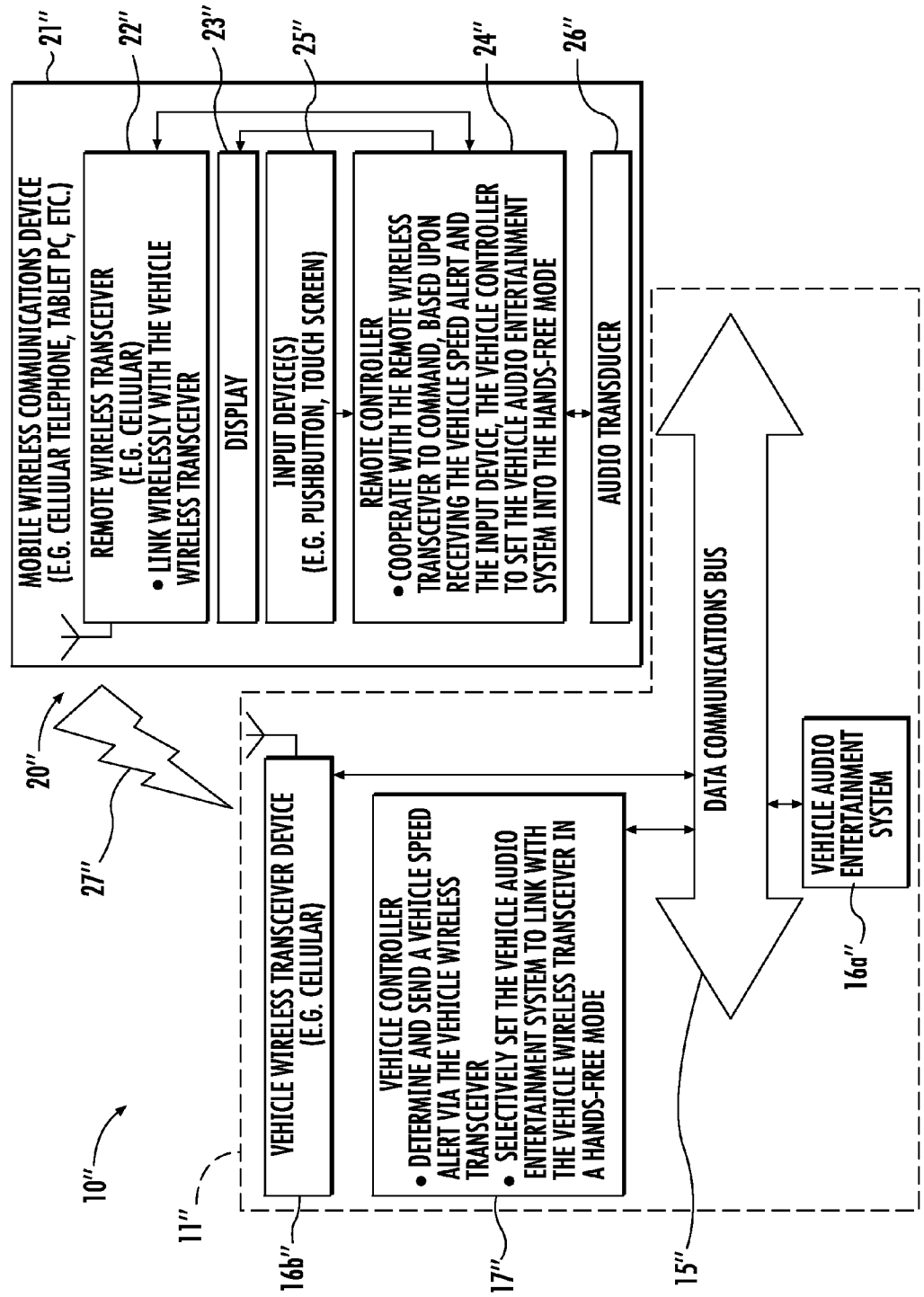
FIG. 3 is a block diagram of a speed alert based system in accordance with an embodiment of the present invention.

Referring now to FIG. 3, in another embodiment, the remote controller 24" may be configured to establish the audio communications link 27" with the vehicle audio entertainment system 16a" based upon the input device 25". More particularly once a vehicle speed alert is received at the mobile wireless communications device 20", the user, may choose to ignore the alert and take no action, or activate or press the input device 25" to command the vehicle controller 17" to set the vehicle audio entertainment system 16a" into the hands-free mode and establish the audio communications link 27" with the vehicle audio entertainment system.

Figure 4:
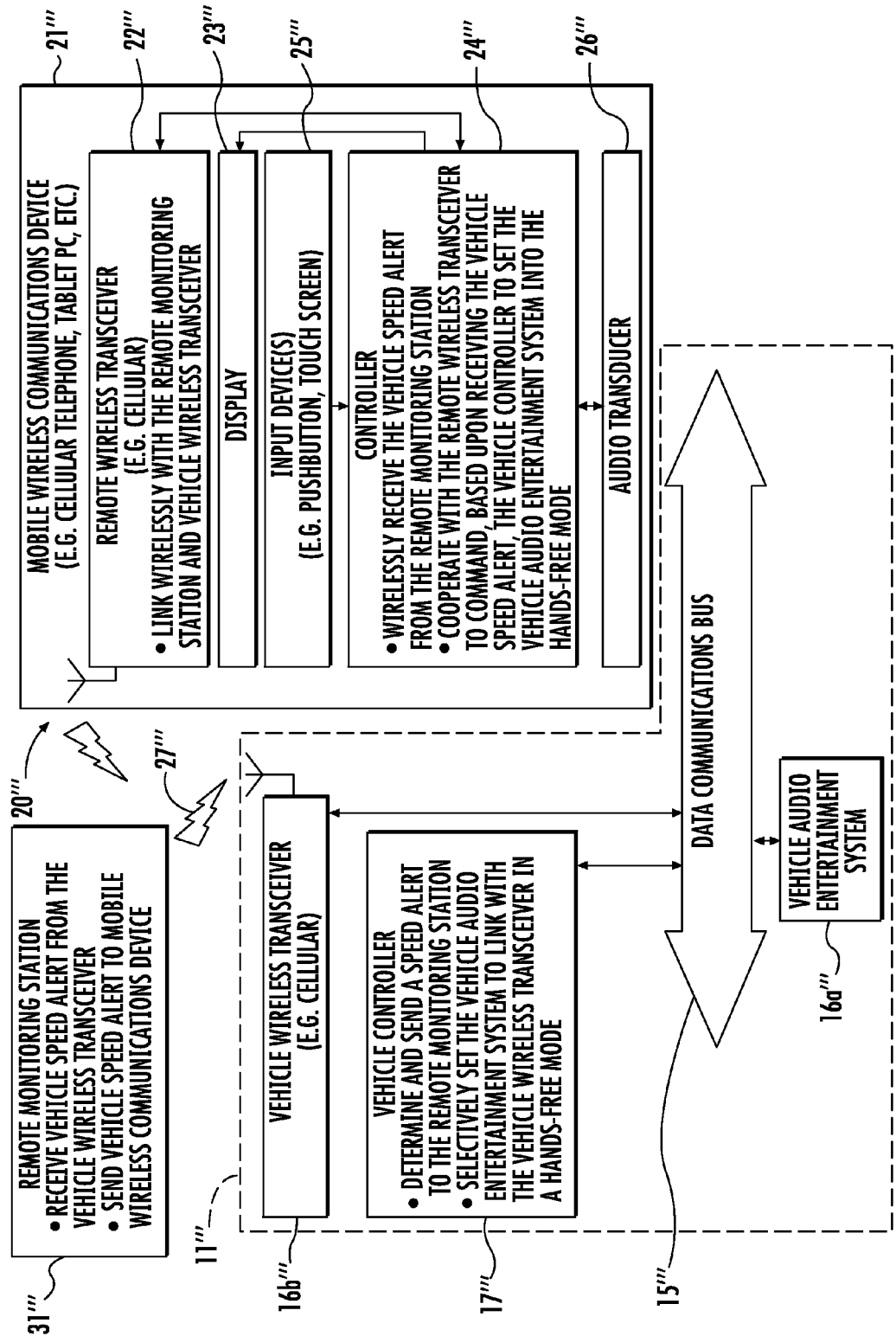
FIG. 4 is a block diagram of a speed alert based system including a remote monitoring station in accordance with an embodiment of the present invention.

Referring now to FIG. 4, in yet another embodiment, the vehicle controller 17''' is configured to send the vehicle speed alert to a remote monitoring station 31'''. The remote monitoring station 31''' may then, in turn, process the vehicle speed alert and wirelessly send the vehicle speed alert to the mobile wireless communications device 20'''. The remote communications device 20''' wirelessly receives the vehicle speed alert from the remote monitoring station 31''' and commands, based upon receiving the vehicle speed alert, the vehicle controller 17''' to set the vehicle audio entertainment system 16a''' to the hands-free mode to establish the audio communication link 27'''.

Figure 5:
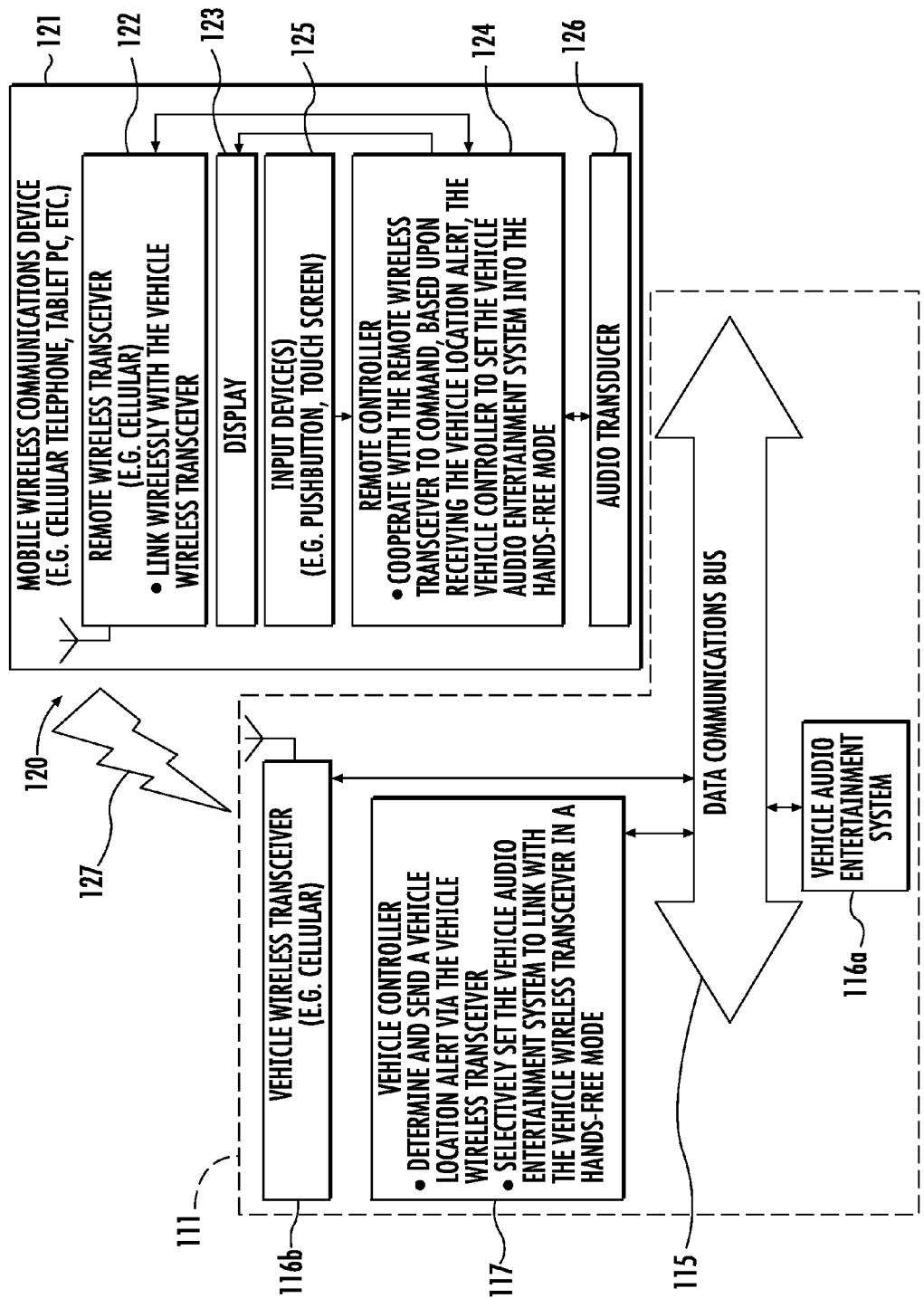
FIG. 5 is a block diagram of a location alert based system in accordance with another embodiment of the present invention.

Referring now additionally to FIG. 5, in another embodiment, the vehicle controller 117 is configured to determine and send a vehicle location alert via the vehicle wireless transceiver 116b to a mobile wireless communications device 120 that is to be carried by a user remote from the vehicle 111. The remote controller 124 is configured to cooperate with the remote wireless transceiver 122 to command, based upon receiving the vehicle location alert, the vehicle controller 117 to set the vehicle audio entertainment system 116a to establish an audio communications link 127.

Figure 6:
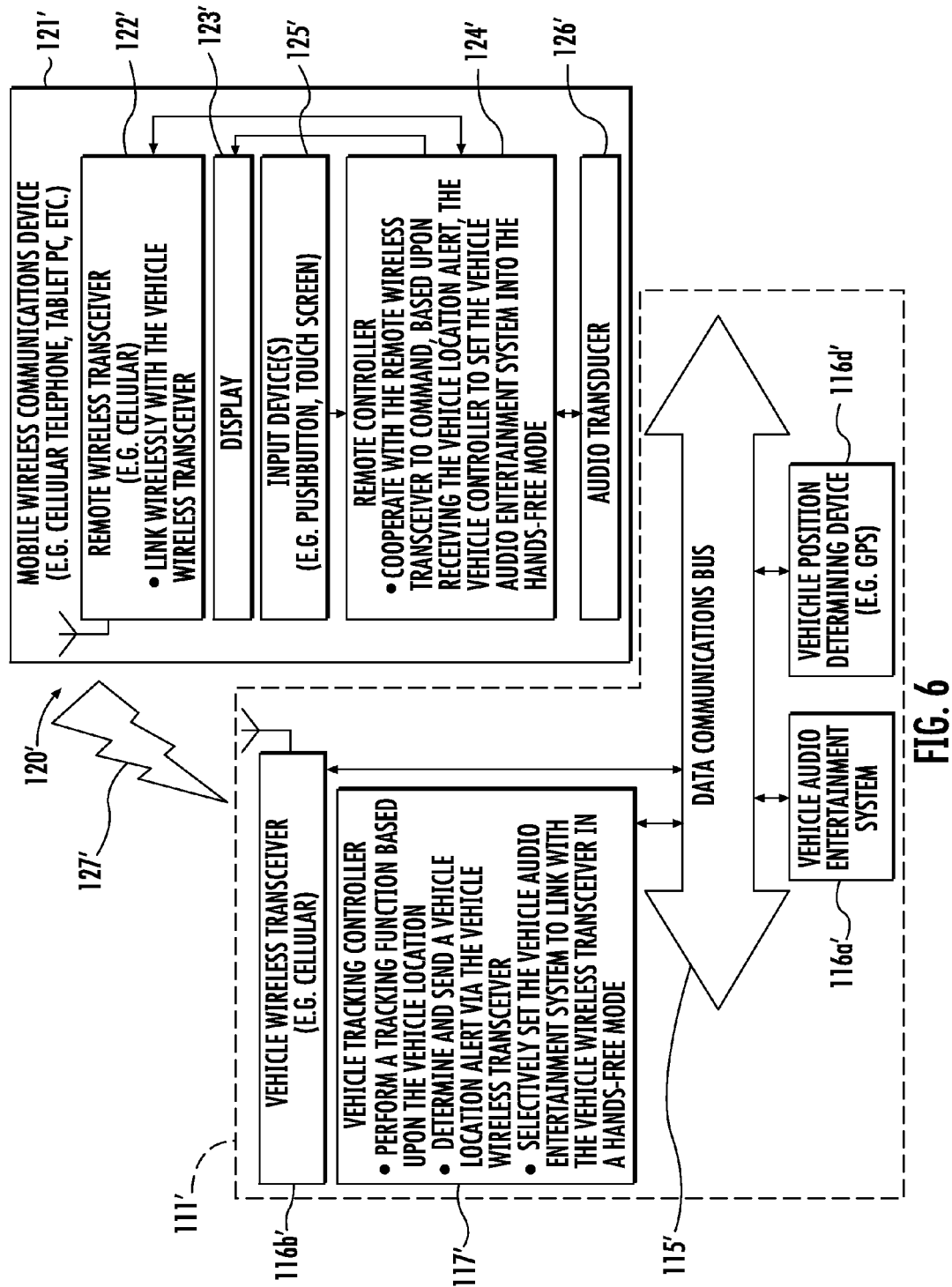
FIG. 6 is a block diagram of a location alert based system including a vehicle position sensor in accordance with an embodiment of the present invention.

Referring now additionally to FIG. 6, in another embodiment, a vehicle device is in the form of vehicle position determining device 116d', for example, a global position system (GPS) receiver. The vehicle position determining device 116d' cooperates with the vehicle controller 117' and the vehicle wireless transceiver 116b' to determine a vehicle position, and send a vehicle location alert. For example, if the vehicle 111' were to be driven outside a geographical area, for example, a few mile radius from a home location, the vehicle controller 117' may send a vehicle location alert to the mobile wireless communications device 120'. Additionally, the vehicle controller may be a tracking controller 117' for performing a tracking function based upon the vehicle location, for example, for which may be used to determine a vehicle condition or status, i.e., stolen. Vehicle device functions may be controlled by the tracking controller 117' based upon the vehicle position. Further details of a vehicle tracking unit for controlling operable vehicle devices using a data communications bus are disclosed in U.S. Pat. No. 6,924,750, assigned to the present assignee, and the entire contents of which are herein incorporated by reference.

Figure 7:
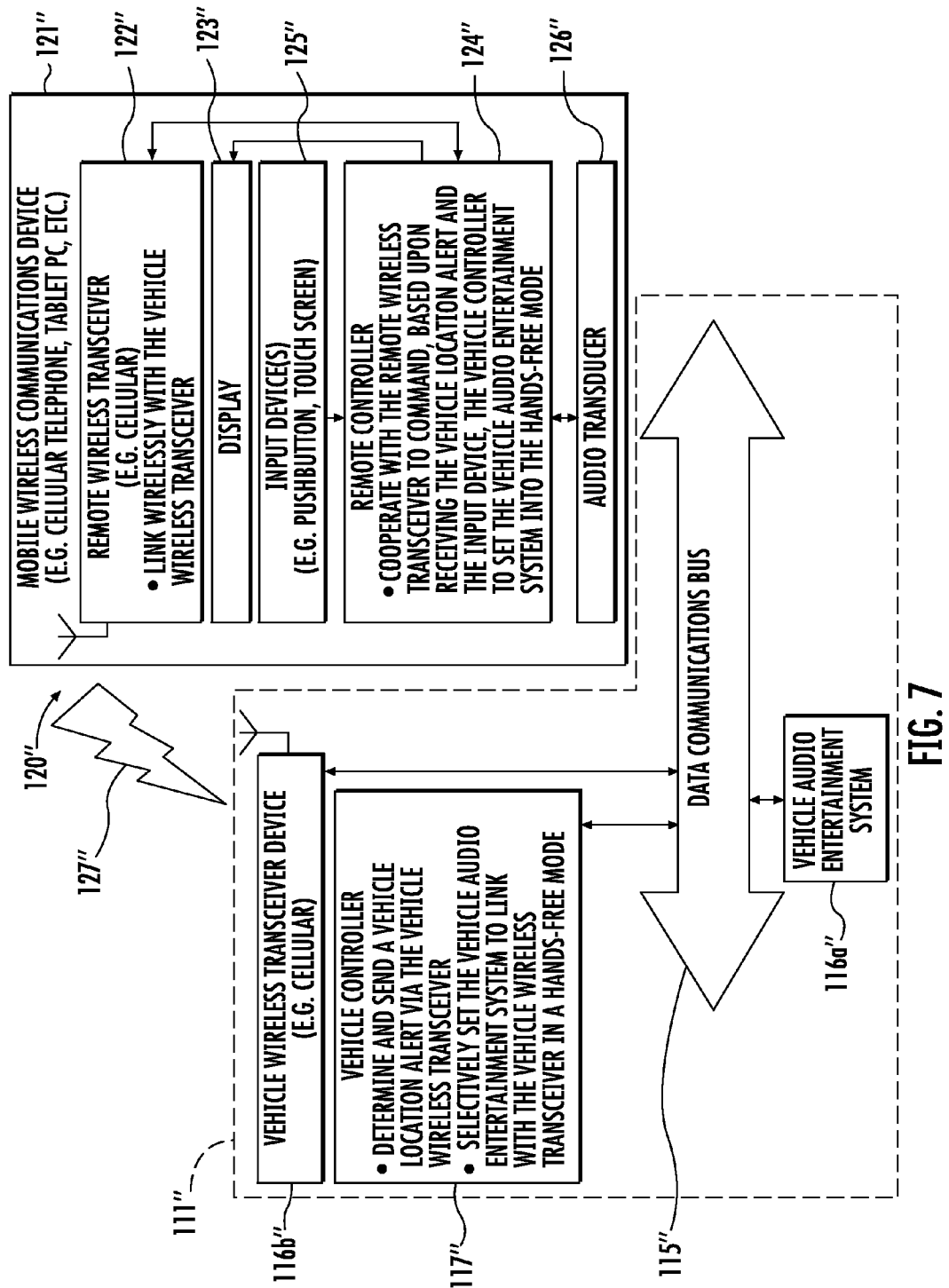
FIG. 7 is a block diagram of a location alert based system in accordance with an embodiment of the present invention.

The remote controller 124' may commend the vehicle controller to set the audio entertainment system 116a' into the hands-free mode and establish the audio communication link 127' based upon the vehicle location alert. As noted above, the vehicle position determining device 116d' may be alternatively or additionally be used to determine a vehicle speed for a vehicle speed alert Referring now to FIG. 7, in another embodiment, the remote controller 124" may be configured to establish the audio communications link 127" with the vehicle audio entertainment system 116a" based upon the input device 125". More particularly once a vehicle location alert is received at the mobile wireless communications device 120", the user, may choose to ignore the alert and take no action, or activate or press the input device 125" to command the vehicle controller 117" to set the vehicle audio entertainment system 116a" into the hands-free mode and establish the audio communications link 127" with the vehicle audio entertainment system.

Figure 8:
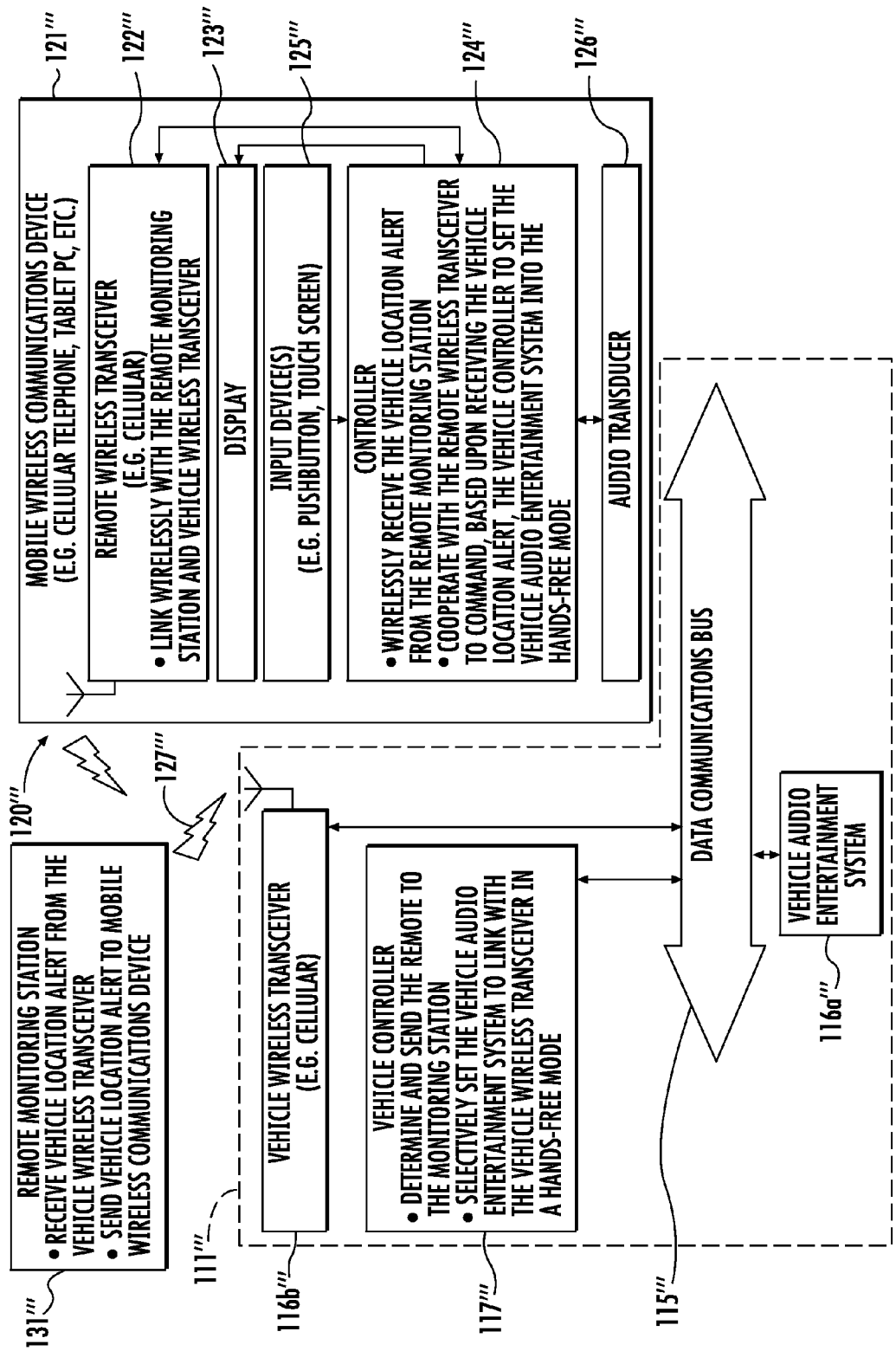
FIG. 8 is a block diagram of a location alert based system including a remote monitoring station in accordance with an embodiment of the present invention.

Referring now to FIG. 8, in yet another embodiment, the vehicle controller 117''' is configured to send the vehicle location alert to a remote monitoring station 131'''. The remote monitoring station 131''' may then, in turn, process the vehicle location alert and wirelessly send the vehicle status alert to the mobile wireless communications device 120'''. The remote communications device 120''' wirelessly receives the vehicle location alert from the remote monitoring station 131''' and commands, based upon receiving the vehicle location alert, the vehicle controller 117''' to set the vehicle audio entertainment system 116a''' into the hands-free mode to establish the audio communication link 127'''.

Figure 9:
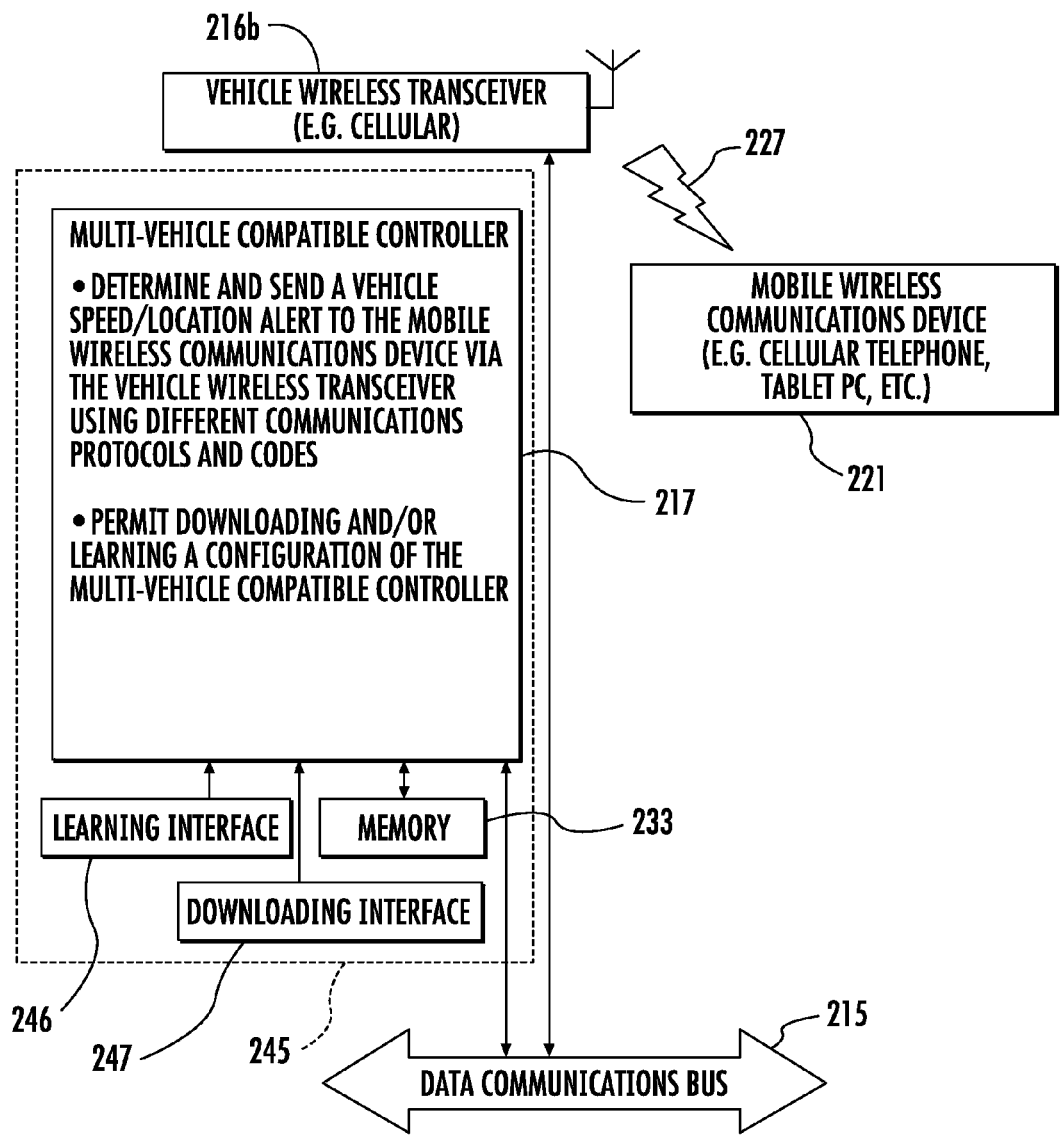
FIG. 9 is a block diagram of a system including a multifunction compatible vehicle controller in accordance with an embodiment of the present invention.

Referring now additionally to FIG. 9, in another embodiment, the vehicle controller 217 is a multi-vehicle compatible controller. The multi-vehicle compatible controller 217 is operable with different vehicles using different data bus protocols and/or different vehicle device bus codes. As will be appreciated by those skilled in the art, the vehicle device bus codes may be unique to each vehicle or vehicle manufacturer. In some embodiments, the different data bus codes and/or data bus protocols may be stored in a memory 233 coupled to the multi-vehicle compatible controller 217. The remote communications device 220 or another remote communications device can be configured to change or set the protocol of the data communications bus 215, the vehicle device bus codes. Further details regarding a multi-vehicle compatible controller are disclosed in U.S. Pat. Nos. 5,719,551 and 6,011,460 to Flick, for example, and application Ser. No. 13/826,752, assigned to the present assignee, and the entire contents of all of which are herein incorporated in their entirety by reference.

To program the multi-vehicle compatible controller 217, a downloading interface 247 may be coupled to the controller to permit downloading a configuration of the controller. The downloading interface 247 may be a wired interface for coupling to a programming device, for example, a laptop or tablet computer. Of course, the downloading interface 247 may be a wireless interface, for example, so that the multi-vehicle compatible controller 217 may be configured or programmed wirelessly, via the Internet or cellular connection, from a programming device. The multi-vehicle compatible controller 217 may be programmed or configured within the vehicle 211 or may be removed from the vehicle for programming. Further details of programming a multi-vehicle compatible controller 217 may be found in U.S. Pat. No. 8,032,278 to Flick, assigned to the present assignee, and the entire contents of which are herein incorporated by reference. Other or additional programming or configuration techniques may be used, as will be appreciated by those skilled in the art. A learning interface 246 may be coupled to the multi-vehicle compatible controller 217 to permit learning a configuration of the controller. For example, new or unrecognized configuration parameters, particularly, data bus or communications codes, may be learned as they are communicated, and thereafter stored in the memory 233. Other or additional learning techniques may be used, as will be appreciated by those skilled in the art. The downloading interface 247 and the learning interface 246 may be particularly useful with the multi-vehicle compatible controller 217 for downloading and learning the vehicle device bus codes and protocols. In some embodiments, the learning interface 246, the downloading interface 247, and the multi-vehicle compatible controller 217 may be carried by a common housing 219. Moreover, it will be appreciated by those skilled in the art that the multi-vehicle compatible controller 217 may be used in any or all of the embodiments described above, for example, for determining and sending a vehicle speed alert and/or a vehicle location alert.

Moreover, while several example types of alerts have been described, it will be appreciated that any number of additional different types of alerts may be sent, and may be based upon corresponding vehicle devices coupled to the data communications bus 15. For example, such device and status pairs may include a fuel level sensor/fuel status alert, tire pressure sensor/tire pressure status alert, etc.

While in the above embodiments, the mobile wireless communications device 20 has been described in one example as a cellular telephone, it will be appreciated by those skilled in the art that the remote communications device may be a tablet personal computer other type of device. Of course, other and/or additional vehicle devices may be coupled to the data communications bus 15 within the vehicle 11. For example, such vehicle devices may be sensors or controllers as disclosed in U.S. Pat. Nos. 5,719,551 and 6,011,460 to Flick, assigned to the present assignee, and the entire contents of both of which are herein incorporated by reference.

Figure 10:
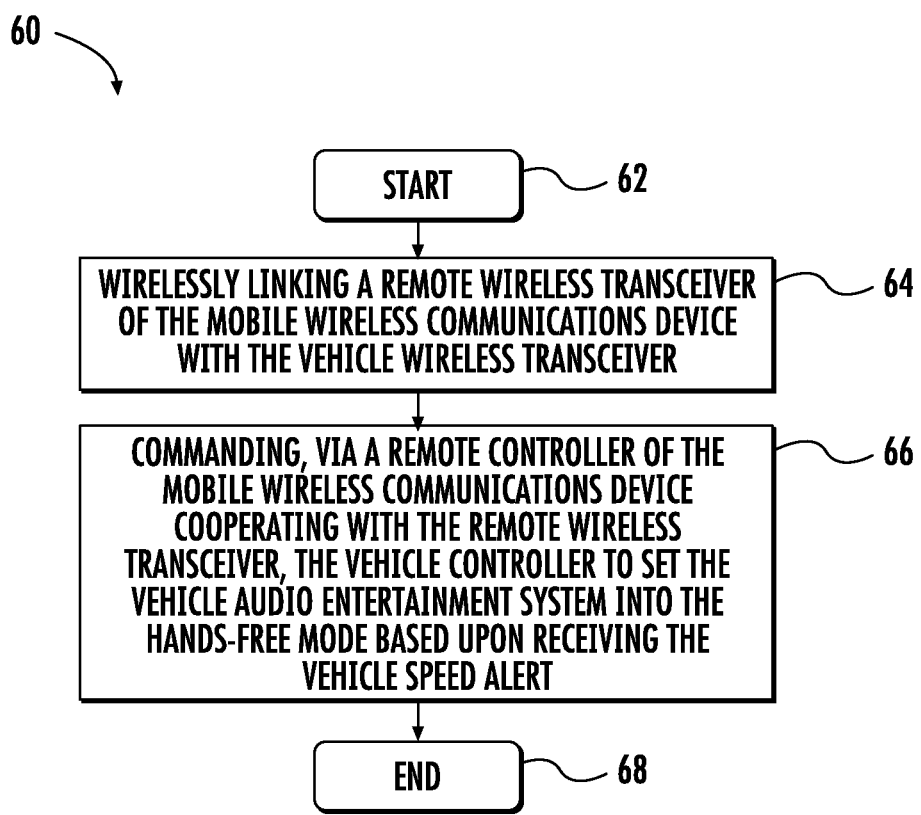
FIG. 10 is a flowchart illustrating operation of the speed alert based system in accordance with the present invention.

Referring now to the flowchart 60 in FIG. 10, starting at Block 62, a method aspect is directed to a method of remotely operating a mobile wireless communications device 20 to be carried by a user remote from a vehicle 11 having a data communications bus 15 extending throughout the vehicle and a vehicle audio entertainment system 16a coupled to the data communication bus. The vehicle 11 also includes a vehicle wireless transceiver 16b and a vehicle controller 17 to be coupled to the data communications bus 15 and configured to determine and send a vehicle speed alert via the vehicle wireless transceiver and selectively set the vehicle audio entertainment system 16a to link with the vehicle wireless transceiver in a hands-free mode. The method includes, at Block 64, wirelessly linking a remote wireless transceiver 22 of the mobile wireless communications device with the vehicle wireless transceiver, and, at Block 66, commanding, via a remote controller 24 of the mobile wireless communications device cooperating with the remote wireless transceiver, the vehicle controller to set the vehicle audio entertainment system 16a into the hands-free mode based upon receiving the vehicle speed alert. The method ends at Block 68.

Figure 11:
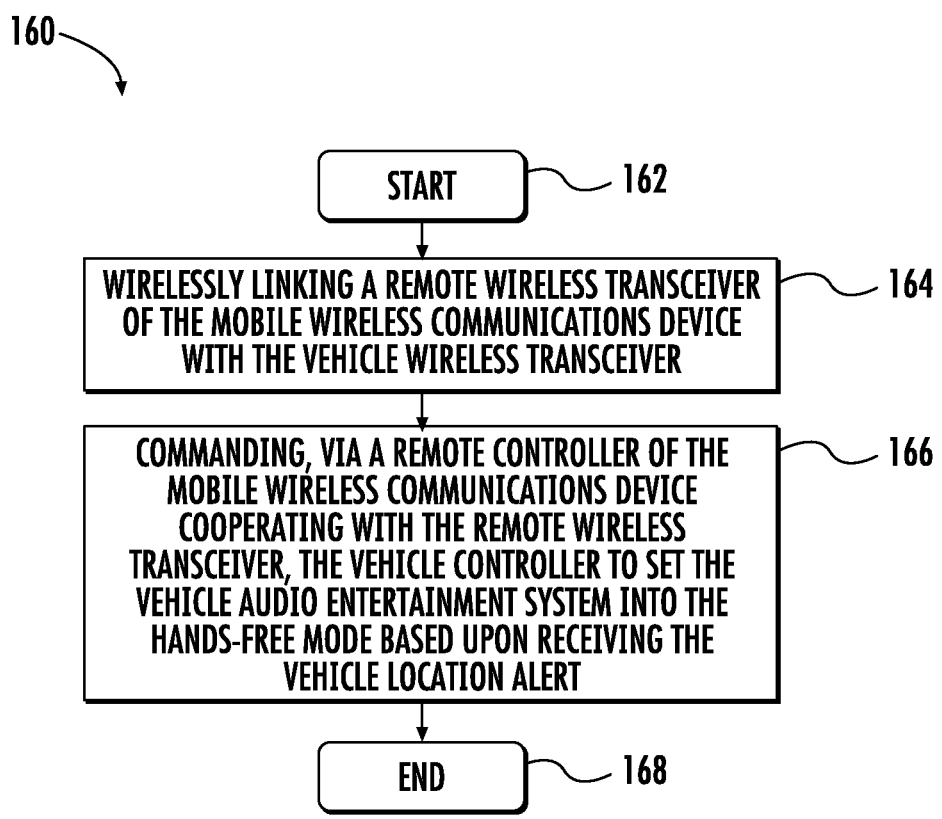
FIG. 11 is a flowchart illustrating operation of the location alert based system in accordance with another embodiment of the present invention.

Referring now to the flowchart 160 in FIG. 11, starting at Block 162, a method aspect is directed to a method of remotely operating a mobile wireless communications device 120 to be carried by a user remote from a vehicle 111 having a data communications bus 115 extending throughout the vehicle and a vehicle audio entertainment system 116a coupled to the data communication bus. The vehicle 111 also includes a vehicle wireless transceiver 116b and a vehicle controller 117 to be coupled to the data communications bus 115 and configured to determine and send a vehicle location alert via the vehicle wireless transceiver and selectively set the vehicle audio entertainment system 116a to link with the vehicle wireless transceiver in a hands-free mode. The method includes, at Block 164, wirelessly linking a remote wireless transceiver 122 of the mobile wireless communications device 120 with the vehicle wireless transceiver 116b, and, at Block 166, commanding, via a remote controller 124 of the mobile wireless communications device cooperating with the remote wireless transceiver, the vehicle controller to set the vehicle audio entertainment system 116a into the hands-free mode based upon receiving the vehicle location alert. The method ends at Block 168.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for a vehicle having a data communications bus extending throughout the vehicle, and a vehicle audio entertainment system coupled to the data communications bus, the system comprising:

a vehicle wireless transceiver;
a multi-vehicle compatible controller to be coupled to the vehicle data communications bus and configured to
determine and send a vehicle location alert via said vehicle wireless transceiver, and
selectively set the vehicle audio entertainment system to link with said vehicle wireless transceiver in a hands-free mode;
a downloading interface coupled to said multi-vehicle compatible controller; and
a mobile wireless communications device to be carried by a user remote from the vehicle and comprising
a portable housing,
a display carried by said portable housing,
at least one input device carried by said portable housing,
a remote wireless transceiver carried by said portable housing and configured to link wirelessly with said vehicle wireless transceiver, and
a remote controller carried by said portable housing and coupled to said display, said at least one input device, and said remote wireless transceiver, said remote controller configured to
present on said display an option, based upon receiving the vehicle location alert, to set the vehicle audio entertainment system into the hands-free mode,
accept user selection of the option via said at least one input device, and
cooperate, based upon acceptance of the option, with said remote wireless transceiver to command, said multi-vehicle compatible controller to set the vehicle audio entertainment system into the hands-free mode.

2. The system of claim 1, wherein said multi-vehicle compatible controller is configured to be operable with at least one of different bus protocols and different vehicle device bus codes.

3. The system of claim 1, wherein said vehicle wireless transceiver and said remote wireless transceiver each comprises a cellular transceiver.

4. The system of claim 1, wherein said multi-vehicle compatible controller is configured to determine the vehicle location alert based upon data on the vehicle data communications bus.

5. A mobile wireless communications device to be carried by a user remote from a vehicle having a data communications bus extending throughout the vehicle, a vehicle audio entertainment system coupled to the data communications bus, a vehicle wireless transceiver, a multi-vehicle compatible controller to be coupled to the data communications bus and operable with a plurality of different vehicles, the multi-vehicle compatible controller configured to determine and send a vehicle location alert via the vehicle wireless transceiver, and selectively set the vehicle audio entertainment system to link with the vehicle wireless transceiver in a hands-free mode, and a downloading interface coupled to the multi-vehicle compatible controller, the mobile wireless communications device comprising:
a portable housing;
a display carried by said portable housing;
at least one input device carried by said portable housing;
a remote wireless transceiver carried by said portable housing and configured to link wirelessly with said vehicle wireless transceiver, and
a remote controller carried by said portable housing and coupled to said display, said at least one input device, and said remote wireless transceiver, said remote controller configured to
present on said display an option, based upon the vehicle location alert, to set the vehicle audio entertainment system in the hands-free mode,
accept user selection of the option via said at least one input device, and
cooperate, based upon acceptance of the option, with said remote wireless transceiver to command the multi-vehicle compatible controller to set the vehicle audio entertainment system into the hands-free mode.

6. The mobile wireless communications device of claim 5, wherein the vehicle wireless transceiver and said remote wireless transceiver each comprises a cellular transceiver.

7. A system for a vehicle having a data communications bus extending throughout the vehicle, and a vehicle audio entertainment system coupled to the data communications bus, the system configured to communicate with a mobile wireless communications device to be carried by a user remote from the vehicle and comprising a portable housing, a display carried by the portable housing, at least one input device carried by the portable housing, a remote wireless transceiver, and a remote controller cooperating with the remote wireless transceiver, the system comprising:
a vehicle wireless transceiver configured to link wirelessly with the remote wireless transceiver;
a downloading interface; and
a multi-vehicle compatible controller to be coupled to the data communications bus, operable with a plurality of different vehicles, and coupled to the downloading interface, said multi-vehicle compatible controller configured to
determine and send a vehicle location alert via said vehicle wireless transceiver, and
set the vehicle audio entertainment system to link with said vehicle wireless transceiver in a hands-free mode based upon a command received from the remote controller, the command being based upon acceptance, via the at least one user input device, of a user selection of an option displayed on the display in response to receiving the vehicle location alert, said multi-vehicle compatible controller to set the vehicle audio entertainment system into the hands-free mode.

8. The system of claim 7, wherein said multi-vehicle compatible controller is configured to be operable with at least one of different bus protocols and different vehicle device bus codes.

9. The system of claim 7, wherein said vehicle wireless transceiver and the remote wireless transceiver each comprises a cellular transceiver.

10. The system of claim 7, wherein said multi-vehicle compatible controller is configured to determine the vehicle location alert based upon data on the vehicle data communications bus.

11. A method of remotely operating a mobile wireless communications device to be carried by a user remote from a vehicle, the mobile wireless communications device comprising a portable housing, a display carried by the portable housing, and at least one input device carried by the portable housing, the vehicle having a data communications bus extending throughout the vehicle, a vehicle audio entertainment system coupled to the data communications bus, a vehicle wireless transceiver, a downloading interface, and a multi-vehicle compatible controller to be coupled to the data communications bus, coupled the downloading interface, and operable with a plurality of different vehicles, the multi-vehicle compatible controller configured to determine and send a vehicle location alert via the vehicle wireless transceiver, and selectively set the vehicle audio entertainment system to link with the vehicle wireless transceiver in a hands-free mode, the method comprising:

wirelessly linking a remote wireless transceiver carried by a portable housing of the mobile wireless communications device with the vehicle wireless transceiver;

presenting, using a remote controller carried by the portable housing and cooperating with the remote wireless transceiver, on the display an option to set the vehicle audio entertainment system into the hands-free mode based upon receiving the vehicle location alert;

accepting, using the remote controller, user selection of the option via the at least one user input device; and commanding, via the remote controller the multi-vehicle compatible controller to set the vehicle audio entertainments system into the hands-free mode based upon acceptance of the option.

12. The method of claim 11, wherein the vehicle wireless transceiver and the remote wireless transceiver each comprises a cellular transceiver.

* * * * *